(12) United States Patent
Lee

(10) Patent No.: US 10,334,529 B2
(45) Date of Patent: Jun. 25, 2019

(54) POWER SAVING METHOD IN AD-HOC NETWORK, AND ELECTRONIC DEVICE PERFORMING THE METHOD

(71) Applicant: Samsung Electronics Co., Ltd., Gyeonggi-do (KR)

(72) Inventor: Sung Hee Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 108 days.

(21) Appl. No.: 15/050,999

(22) Filed: Feb. 23, 2016

(65) Prior Publication Data

US 2016/0249293 A1    Aug. 25, 2016

(30) Foreign Application Priority Data

Feb. 23, 2015 (KR) .................. 10-2015-0025218

(51) Int. Cl.
*H04W 52/02* (2009.01)
*H04W 84/18* (2009.01)

(52) U.S. Cl.
CPC ... *H04W 52/0235* (2013.01); *H04W 52/0229* (2013.01); *H04W 52/0251* (2013.01); *H04W 52/0274* (2013.01); *H04W 84/18* (2013.01); *Y02D 70/1242* (2018.01); *Y02D 70/1262* (2018.01); *Y02D 70/142* (2018.01); *Y02D 70/144* (2018.01); *Y02D 70/164* (2018.01);
(Continued)

(58) Field of Classification Search
CPC ......... H04W 52/0235; H04W 52/0229; H04W 52/0251; H04W 52/0274; H04W 28/0221; H04W 84/18; Y02B 60/50
See application file for complete search history.

(56) References Cited

U.S. PATENT DOCUMENTS 7,672,263 B2    3/2010   Sinivaara
8,098,614 B1 *  1/2012   Wang ................ H04W 52/0203
                                                        370/318
(Continued)

OTHER PUBLICATIONS

Narendran Rajagopalan et al., "Modified Power Save Model for Better Energy Efficiency and Reduced Packet Latency", American Journal of Engineering and Applied Sciences, vol. 5, Issue 3, 2012, 8 pages.

(Continued)

*Primary Examiner* — Charles C Jiang
*Assistant Examiner* — Kyaw Z Soe
(74) *Attorney, Agent, or Firm* — The Farrell Law Firm, P.C.

(57) ABSTRACT

An electronic device and a power saving method of an electronic device forming an ad-hoc network are provided. The electronic device includes a communication circuit configured to transmit a beacon frame defining a beacon interval to an external device forming an ad-hoc network with the electronic device; and a processor configured to determine a state of the communication circuit during the beacon interval based on whether an announcement traffic indication message (ATIM) frame is transceived between the electronic device and the external electronic device. The method includes receiving power saving mode support information indicating whether to support a power saving mode function, from at least one external device; and activating or deactivating the power saving mode function of the electronic device based on the power saving mode support information.

10 Claims, 11 Drawing Sheets

(52) U.S. Cl.
CPC .......... *Y02D 70/166* (2018.01); *Y02D 70/168* (2018.01); *Y02D 70/22* (2018.01); *Y02D 70/26* (2018.01)

(56) References Cited

U.S. PATENT DOCUMENTS

| | | | |
|---|---|---|---|
| 8,537,733 B1 | 9/2013 | Panneerselvam et al. | |
| 9,185,655 B2 | 11/2015 | Panneerselvam et al. | |
| 2005/0190767 A1* | 9/2005 | Lee | H04L 12/5601 370/395.1 |
| 2006/0285528 A1* | 12/2006 | Gao | H04W 52/0229 370/338 |
| 2007/0036096 A1* | 2/2007 | Sinivaara | H04W 52/0229 370/318 |
| 2008/0125190 A1* | 5/2008 | Jan | H04W 52/0216 455/574 |
| 2013/0329618 A1* | 12/2013 | Panneerselvam | H04W 52/0235 370/311 |
| 2015/0016322 A1* | 1/2015 | Yenganti | H04W 40/005 370/311 |

OTHER PUBLICATIONS

Xudong Wang et al., "IEEE 802.11s Wireless Mesh Networks: Framework and Challenges", Ad Hoc Networks, Aug. 1, 2008, 15 pages.
Draft Standard for Information Technology—Telecommunications and Information Exchange between Systems—Local and Metropolitan Area Networks; Specific Requirements—Part 11: Wireless LAN Medium Access Control (MAC) and Physical Layer (PHY) Specifications Amendment <number>: Mesh Networksing, IEEE P802.11s/D1.08, Jan. 2008, 248 pages.
International Search Report dated Jun. 7, 2016 issued in counterpart application No. PCT/KR2016/001637, 11 pages.
European Search Report dated Jun. 20, 2016 issued in counterpart application No. 16156946.2-1855, 9 pages.

* cited by examiner

POWER SAVING METHOD IN AD-HOC NETWORK, AND ELECTRONIC DEVICE PERFORMING THE METHOD

PRIORITY

This application claims priority under 35 U.S.C. § 119(a) to a Korean Patent Application filed on Feb. 23, 2015 in the Korean Intellectual Property Office and assigned Serial No. 10-2015-0025218, the entire disclosure of which is incorporated herein by reference.

BACKGROUND

1. Field of the Disclosure

The present disclosure relates generally to a power saving method in an electronic device forming an ad-hoc network and, more particularly to, an electronic device that includes a communication circuit configured to transmit a beacon frame to an external device forming an ad-hoc network and a processor configured to determine a state of the communication circuit during the beacon interval based on whether to transceive an announcement traffic indication message (ATIM) frame between the electronic device and the external electronic device.

2. Description of the Related Art

An ad-hoc network indicates a network with no infrastructure in which there is no central manager managing an overall data flow. An ad-hoc network provides mobility to a mobile terminal, and an ad-hoc network providing mobility is referred to as a mobile ad-hoc network (MANET).

In an ad-hoc network providing mobility, generally, a connection between mobile terminals may be implemented through a multi-hopping technology of a peer-to-peer level. Because a fixed base station does not support a mobile service at an ad-hoc network providing mobility, each mobile terminal may form a network routing infra-structure in an ad-hoc form.

However, because mobile terminals generally operate based on a battery with a limited capacity, power consumption is relatively great. Accordingly, at an ad-hoc network, power saving technology of a mobile terminal is an important issue.

SUMMARY

Aspects of the present disclosure are to address at least the above-mentioned problems and/or disadvantages and to provide at least the advantages described below. Accordingly, an aspect of the present disclosure is to provide a power saving method which markedly reduces power consumption compared with the power saving method according to a wireless communication standard and addresses a compatibility issue about a power saving mode occurring in an ad-hoc network and an electronic device performing the same.

In accordance with an aspect of the present disclosure, an electronic device is provided. The electronic device includes a communication circuit configured to transmit a beacon frame defining a beacon interval to an external device forming an ad-hoc network with the electronic device; and a processor configured to determine a state of the communication circuit during the beacon interval based on whether an ATIM frame is transceived between the electronic device and the external electronic device.

In accordance with an aspect of the present disclosure, an electronic device supporting a power saving mode function is provided. The electronic device includes a communication circuit configured to receive power saving mode support information, indicating whether the power saving mode function is supported, from the electronic device and at least one external device forming an ad-hoc network; and a processor configured to activate or deactivate the power saving mode function based on the received power saving mode support information.

In accordance with an aspect of the present disclosure, a power saving method of an electronic device forming an ad-hoc network are provided The method includes receiving power saving mode support information indicating whether to support a power saving mode function, from at least one external device; and activating or deactivating the power saving mode function of the electronic device based on the power saving mode support information.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
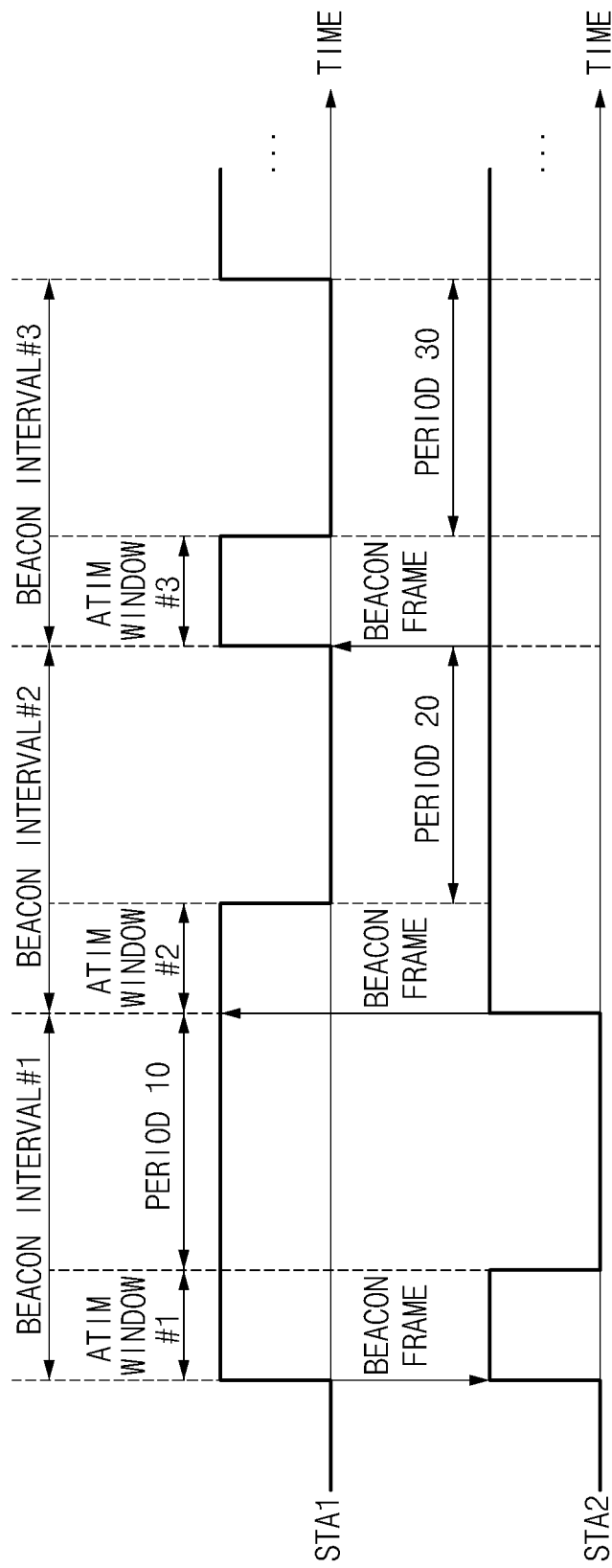
FIG. 1 is a timing diagram of an electronic device.

Various embodiments of the present disclosure are described with reference to the accompanying drawings. Accordingly, those of ordinary skill in the art will recognize that modifications, equivalents, and/or alternatives on the various embodiments described herein may be variously made without departing from the scope and spirit of the present disclosure. With regard to the description below of the accompanying drawings, similar components may be marked by similar reference numerals.

In the present disclosure, the terms "have," "may have," "include," "comprise," "may include," and "may comprise" used herein indicate the existence of corresponding features (e.g., elements such as numeric values, functions, operations, or components), but do not exclude the presence of additional features.

In the present disclosure, the terms "A or B," "at least one of A and/or B," or "one or more of A and/or B," and the like used herein may include any and all combinations of one or more of the associated listed items. For example, the term "A or B," "at least one of A and B," or "at least one of A or B" may refer to all of case (1) where at least one A is included, case (2) where at least one B is included, and case (3) where both of at least one A and at least one B are included.

The terms "first," "second," and the like used herein may refer to various elements of various embodiments of the present disclosure, but are not intended to limit the present disclosure. For example, such terms are not intended to limit the order and/or priority of the elements. For example, "a first user device" and "a second user device" indicate different user devices. For example, without departing the scope and spirit of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the term "configured to" used herein may be used interchangeably with, for example, the terms "suitable for," "having the capacity to," "designed to," "adapted to," "made to," or "capable of." The term "configured to" may not indicate only "specifically designed to" in hardware. Instead, the term "a device configured to" may indicate that the device is "capable of" operating together with another device or other components. For example, the term "processor configured to perform A, B, and C" may indicate a dedicated processor (e.g., an embedded processor) for performing a corresponding operation or a general purpose processor (e.g., a central processing unit (CPU) or an application processor (AP)) which may perform corresponding operations by executing one or more software programs which are stored in a memory device.

Terms used in present disclosure are used to describe certain embodiments of the present disclosure and are not intended to limit the scope of the present disclosure. The terms of a singular form may include plural forms unless otherwise specified. Unless otherwise defined herein, all the terms used herein, may have the same meanings that are generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are defined in the specification, they are not intended to be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. A wearable device according to various embodiments of the present disclosure may include at least one of an accessory type (e.g., watch, ring, bracelet, ankle bracelet, necklace, glasses, contact lens, or head-mounted-device (HMD)), a fabric or clothing type (e.g., electronic apparel), a physical attachment type (e.g., skin pad or tattoo), or a body implantation type (e.g., implantable circuit).

According to various embodiments of the present disclosure, electronic devices may be home appliances. Home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA) device, a magnetic resonance imaging (MRI) device, a computed tomography (CT) device, scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). Electronic devices according to various embodiments of the present disclosure may be one or more combinations of the above-mentioned devices. According to various embodiments of the present disclosure, an electronic device may be a flexible electronic device. Also, electronic devices according to various embodiments of the present disclosure are not limited to the above-mentioned devices, and may include new electronic devices according to the development of new technologies.

According to an embodiment of the present disclosure, the above-described electronic device is a component forming an ad-hoc network and includes a mobile terminal, a mobile node, a station (STA), and the like.

In a timing chart included in a portion of diagrams according to an embodiment of the present disclosure, "logic high" may indicate that an electronic device (i.e., a communication circuit in the electronic device) is in an "awake" state. "Logic low" may indicate that an electronic device is in a "low power consumption" or "doze" state. The awake state may indicate that an electronic device is capable of transceiving data to/from other electronic devices. The doze state may indicate a state in which power consumption is much less in amount than power consumption in the awake state, but data is not transceived.

Hereinafter, electronic devices according to various embodiments of the present disclosure are described with reference to the accompanying drawings. The term "user" used herein may refer to a person who uses an electronic device or may refer to a device (e.g., an artificial intelligence electronic device) that uses an electronic device.

FIG. 1 is a timing diagram of an electronic device.

An Institute of Electrical and Electronics Engineers (IEEE) 802.11 wireless communication standard may specify an independent basic service set (IBSS) which enables communication between mobile terminals having the same level without a centralized master terminal. The IBSS of IEEE 802.11 wireless communication standard may define a power saving method for reducing power consumption (e.g., power consumption according to an idle current) of a mobile terminal.

Referring to FIG. 1, an ad-hoc network may include two mobile terminals STA1 and STA2 which are spaced apart from each other by an interval of one hop. A power saving method according to a wireless communication standard may be performed at each of the mobile terminals STA1 and STA2. FIG. 1 illustrates a case where the mobile terminals STA1 and STA2 do not transmit data packets to each other.

The mobile terminals STA1 and STA2 may randomly transmit a beacon frame to each other at a beacon interval. The beacon interval (or beacon gap) may start at the transmission of the beacon frame. The beacon interval may be repeated at a constant time interval and may be divided into two periods. A certain time after a beacon interval starts may be referred to as an announcement traffic indication message (ATIM) window, and a time from a point in time when an ATIM window ends to a starting time of a next beacon interval may be referred to as a data transmission window. In a case where there is data to be transmitted to each mobile terminal STA1 or STA2, the mobile terminal STA1 or STA2 may transmit an ATIM frame during an ATIM window, and data may be transceived during the data transmission window. In this case, the term "transceive" may indicate a combination of transmit and receive.

The mobile terminal STA1 may transmit a beacon frame to the mobile terminal STA2. If transmitting a beacon frame, the mobile terminal STA1 may maintain an awake state throughout a beacon interval #1. On the other hand, the mobile terminal STA2 receiving a beacon frame may maintain an awake state during an ATIM window in the beacon interval #1. If the mobile terminal STA2 recognizes that the ATIM frame is not transmitted during the ATIM window, the mobile terminal STA2 may maintain a doze state from an end time of the ATIM window to a starting time of a beacon interval #2. This may be equally applied to the beacon interval #2 or a beacon interval #3.

In a power saving method according to the above-described wireless communication standard, even though a mobile terminal transmitting a beacon frame does not transmit or receive an ATIM frame, the mobile terminal may maintain an awake state throughout a corresponding beacon interval. Accordingly, power may be unnecessarily consumed during periods such as periods 10, 20, and 30 illustrated in FIG. 1. Because two mobile terminals transmit a beacon frame to each other at a probability of 0.5, the two mobile terminals may maintain a doze state during about half of the whole beacon interval on average in a case where data is not transmitted.

In the power saving method according to a wireless communication standard, as the number of mobile terminals forming an ad-hoc network increases, the probability of receiving a beacon frame may increase, and thus power consumption may be reduced. However, for example, in a case where one mobile terminal forms an ad-hoc network, a mobile terminal may continuously transmit a beacon frame, and thus the mobile terminal may not enter a doze state. That is, as the number of mobile terminals forming an ad-hoc network decreases, power consumption may be significantly reduced.

Moreover, according to the IBSS mode of the IEEE 802.11 wireless communication standard, a value of a static ATIM window (or an ATIM window period) may be set to implement a smooth data communication. Accordingly, all mobile terminals forming an ad-hoc network may have a value of the same ATIM window (or an ATIM window period) as well as may support the power saving method described above with reference to FIG. 1. However, among mobile terminals, any mobile terminal may not support the power saving method. As a result, a compatibility issue may occur. That is, a single ad-hoc network may not be formed using a mobile terminal supporting the power saving method and a mobile terminal not supporting the power saving method.

Figure 2:
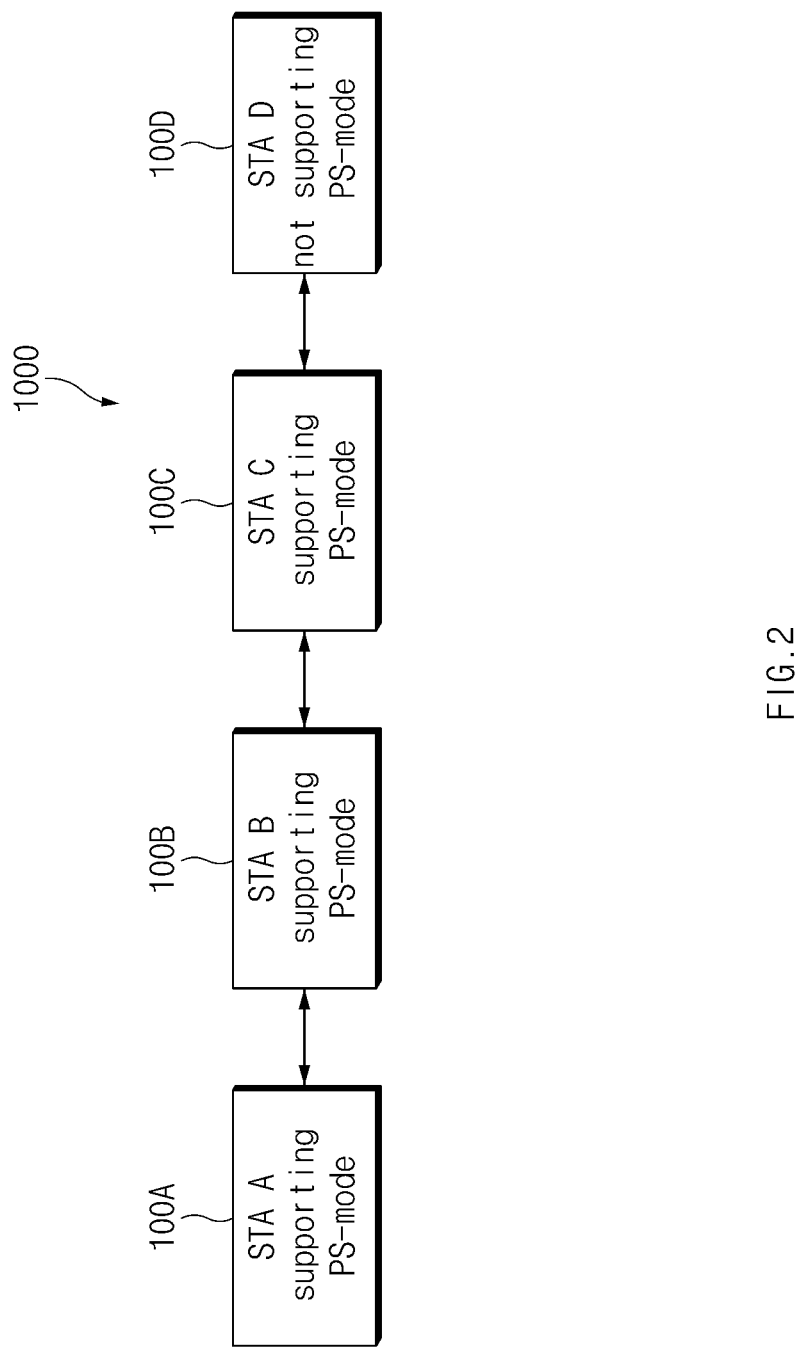
FIG. 2 is a block diagram of an environment in which a power saving method is performed, according to an embodiment of the present disclosure.

FIG. 2 is a block diagram of an environment in which a power saving method is performed, according to an embodiment of the present disclosure.

Referring to FIG. 2, an environment in which a power saving method is performed may include an ad-hoc network 1000. The ad-hoc network 1000 may include an electronic device (STA A) 100A, an electronic device (STA B) 100B, an electronic device (STA C) 100C, and an electronic device (STA D) 100D. In the electronic devices 100A, 100B, 100C, and 100D, two adjacent electronic devices may be spaced apart from each other by one hop.

The ad-hoc network 1000 may be referred to as a wireless ad-hoc network (WANET). The ad-hoc network 1000 may not be limited to a WANET and may be a MANET which is capable of providing mobility to electronic devices.

The electronic devices 100A, 100B, 100C, and 100D may perform data communication in the ad-hoc network 1000. For example, a data packet transmitted from the electronic device 100A may be transmitted to other electronic devices in a hop-by-hop fashion during another beacon interval by one hop. Each of the electronic devices 100A, 100B, and 100C may be an electronic device supporting a power saving mode, and the electronic device 100D may be an electronic device that does not support a power saving mode. A configuration and a function of each of the electronic devices 100A, 100B, 100C, and 100D are described below with reference to FIGS. 3 to 11.

Figure 3:
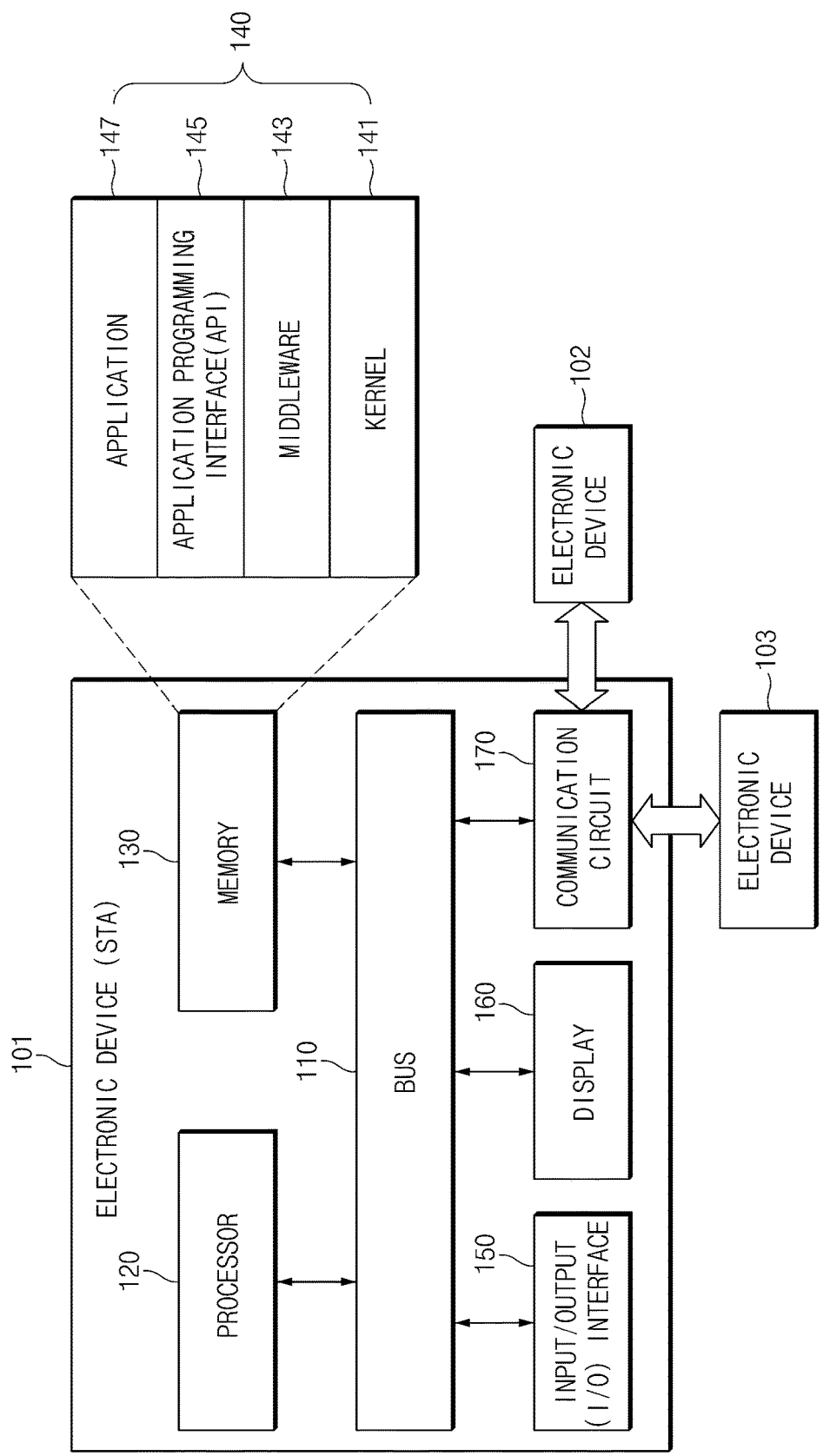
FIG. 3 is a block diagram of an electronic device, according to an embodiment of the present disclosure.

FIG. 3 is a block diagram of an electronic device 101 according to an embodiment of the present disclosure.

Referring to FIG. 3, the electronic device 101 is in a network environment. The electronic device 101 may be one of the electronic devices 100A, 100B, and 100C which are illustrated in FIG. 2. The electronic device 101 may include a bus 110, a processor 120, a memory 130, an input/output (I/O) interface 150, a display 160, and a communication circuit (or a communication module) 170. The electronic device 101 may not include at least one of the above-described components or may further include other component(s).

For example, the bus 110 may interconnect the above-described components 120 to 170 and may include a circuit for conveying communications (e.g., a control message and/or data) among the components 120 to 170.

The processor 120 may include one or more of a CPU, an AP, or a communication processor (CP). The processor 120 may perform, for example, data processing or an operation associated with control or communication of at least one other component(s) of the electronic device 101.

The processor 120 may set an operating mode of the electronic device 101 and may control a function and an operation of each of components (e.g., a communication circuit 170) in the electronic device 101 based on the operating mode. For example, the operating mode may include an active mode and a power saving mode. Generally, the active mode may indicate that the communication circuit 170 continuously maintains an awake state during a beacon interval. Moreover, the power saving mode may indicate that the communication circuit 170 maintains an awake state during a portion period of the beacon interval and maintains a doze state during the remaining period.

According to an embodiment of the present disclosure, each of the electronic device 101, an electronic device 102, and an electronic device 103 may support the power saving mode. For example, the electronic devices 101, 102, and 103 each of which supports a power saving mode function may correspond to the electronic devices 100A, 100B, and 100C, respectively. Below, a relation with the electronic device 102 is described based on the processor 120 of the electronic device 101. Electronic devices 102 and 103 may be referred to as external electronic devices.

In a case where the electronic devices 101 and 102 operate in the power saving mode, the processor 120 may determine a state of the communication circuit 170 during an beacon interval based on whether to transceive an ATIM frame between the electronic devices 101 and 102.

A beacon interval may indicate a time period in which a beacon frame is transmitted between the electronic devices 101 and 102. A beacon interval may have a value of 100 time units (100 TUs). One TU may correspond to 1024 μs (e.g. about 1 ms).

A beacon interval may include two periods which are a first period and a second period. During a beacon interval, a first period may be a certain time period from a starting time of the beacon interval, and the second period may be a certain time period from an end of the first period to a starting time of a next beacon interval. The processor 120 may set a state of the communication circuit 170 to an awake state during a first period and may determine the state of the communication circuit 170 during a second period based on whether to transceive an ATIM frame during the first period.

During a first period, an ATIM frame may be transceived between the electronic devices 101 and 102. The first period may be referred to as an ATIM window period or simply an ATIM window. For example, a first period may be set to 10 to 30 TUs (e.g., about 10 ms to 30 ms). During a first period, the state of the communication circuit 170 may have been previously set to an awake state or may be determined by the processor 120 so as to be set to the awake state.

An ATIM frame may include, for example, a broadcast ATIM frame in which a destination is not specified and a unicast ATIM frame in which a destination is specified. An ATIM frame may imply that the electronic device 101 or 102 has buffered data to be transmitted to the electronic device 102 or 101.

During the second period, a data frame (and an acknowledgement (ACK) frame corresponding to the data frame) may be transmitted between the electronic device 101 and the external electronic device 102. For example, the second period may be referred to as a data transmission window.

If the ATIM frame is transceived during the first period, the processor 120 may determine the state of the communication circuit 170 as the awake state, and thus a data communication between the electronic device 101 and the external electronic device 102 may be performed. That is, the transmission (i.e., data communication) of the data frame during the second period may be performed with the assumption that the ATIM frame is transceived during the first period.

According to an embodiment of the present disclosure, an end of service period (EOSP) message may be transceived after a data communication during at least one portion of the second period. In this case, the processor 120 may determine the state of the communication circuit 170 so as to be changed from the awake state to the doze state. The state of the communication circuit 170 may be changed into the doze state after the transmission of a certain data frame during the second period, thereby reducing nonessential power consumption.

In addition, if an ATIM frame is not transceived during the first period, the processor 120 may determine the state of the communication circuit 170 as the doze state during the second period. That the ATIM frame is not transceived between the electronic devices 101 and 102 may indicate that there is no data to be transmitted. Accordingly, each of the communication circuits in the electronic device 101 and the external electronic device 102 may enter the doze state during the second period.

According to an embodiment of the present disclosure, each of the electronic devices 101 and 102 may support the power saving mode function, and an external electronic device 103 may not support the power saving mode function. For example, the electronic devices 101, 102, and 103 may correspond to the electronic devices 100C, 100B, and 100D illustrated in FIG. 2, respectively.

According to an embodiment of the present disclosure, the processor 120 of the electronic device 101 may activate or deactivate the power saving mode function of the electronic device 101 based on power saving mode support information received from at least one external device 102 and 103. The processor 120 of the electronic device 101 may determine whether a device not supporting the power saving mode function is included in the at least one external device based on the power saving mode support information received from at least one external device. The processor 120 of the electronic device 101 may set an operating mode of the electronic device 101 to the power saving mode (i.e., activation of the power saving mode function) or to an active mode (i.e., deactivation of the power saving mode function) based on the determination result.

The power saving mode support information may indicate whether an electronic device transmitting the power saving mode support information supports the power saving mode function and may be, for example, information about an ATIM window period. If the processor 120 receives ATIM window period information of which the ATIM window period is set to 0, the processor 120 may determine a device transmitting the power saving mode support information as a device not supporting the power saving mode function (i.e., device not supporting power saving mode).

According to an embodiment of the present disclosure, if the electronic device 103 not supporting the power saving mode function is included in at least one external device (e.g., electronic devices 102 and 103), the processor 120 of the electronic device 101 may deactivate the power saving mode function of the electronic device 101. If the power saving mode function is deactivated, an operating mode of the electronic device 101 may be set to an active mode. Accordingly, the state of the communication circuit 170 may be the awake state during the beacon interval.

The processor 120 of the electronic device 101 may perform a data communication with the electronic device 103 not supporting the power saving mode function through the communication circuit 170 during at least a portion of the beacon interval (e.g., the second period or a whole period of the beacon interval). Then, the electronic device 103 not supporting the power saving mode function may not transmit the ATIM frame, and the electronic device 101 may operate in an active mode (i.e., the communication circuit 170 maintains the awake state). Accordingly, the electronic device 103 not supporting the power saving mode function may immediately perform a data communication with the electronic device 101, not transceiving the ATIM frame.

Moreover, the processor 120 of the electronic device 101 may perform a data communication with the electronic device 102 supporting the power saving mode function through the communication circuit 170 based on whether to transceive the ATIM frame. For example, while the communication circuit 170 maintains the awake state, the electronic device 101 may transceive the ATIM frame to/from the electronic device 102 supporting the power saving mode function during the first period of the beacon interval and may perform a data communication with the electronic device 102 during the second period of the beacon interval.

As a result, the electronic device 101 may perform a data communication with the electronic device 102 supporting the power saving mode and the electronic device 103 not supporting the power saving mode in different schemes, with an active mode maintained.

In addition, if a device, which does not support the power saving mode, from among at least one external device 102 and 103 is not included in an ad-hoc network, the processor 120 of the electronic device 101 may activate the power saving mode function of the electronic device 101. That is, if each of the at least one external device may support the power saving mode function, the processor 120 of the electronic device 101 may set an operating mode to a power saving mode.

Then, each electronic device in an ad-hoc network may operate in the power saving mode, as described above, and thus the processor of each of the electronic devices may determine the state of the communication circuit 170 during the beacon interval based on whether to transceive the ATIM frame to/from any other electronic device.

The memory 130 may include a volatile and/or nonvolatile memory. For example, the memory 130 may store instructions or data associated with at least one other component(s) of the electronic device 101. The memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more requests received from the application program 147 according to a priority. For example, the middleware 143 may assign a priority, which makes it possible to use a system resource (e.g., the bus 110, the processor 120, the memory 130, or the like) of the electronic device 101, to at least one of the application program 147. For example, the middleware 143 may process the one or more requests according to the priority assigned to the at least one request, which makes it possible to perform scheduling or load balancing on the one or more requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other component(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a portion of a user's body.

For example, the communication circuit 170 may establish communication between the electronic device 101 and an external device (e.g., the external electronic device 102). For example, the communication circuit 170 may be connected to a network (e.g., ad-hoc network) through wireless communication or wired communication to communicate with an external device (e.g., an external electronic device 102).

The communication circuit 170 may be set to transceive various control frames and/or data frames between the electronic device 101 and the electronic device 102 forming an ad-hoc network. For example, the control frame may include a beacon frame defining the beacon interval, a probe request frame, and a probe response frame. The beacon frame, the probe request frame, and/or the probe response frame may include power saving mode support information.

The wireless communication may include at least one of, for example, long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network (LAN). The LAN may include at least one of wireless fidelity (Wi-Fi), near field communication (NFC), or a global global navigation satellite system (GNSS), or the like. The GNSS may include at least one of a global positioning system (GPS), a global navigation satellite system (Glonass), BeiDou Navigation Satellite System ("BeiDou") or the European global satellite-based navigation system ("Galileo"), or the like. In the present disclosure, "GPS" and "GNSS" may be interchangeably used. The wired communication may include at least one of, for example, a universal serial bus (USB), a high definition multimedia interface (HDMI), a recommended standard-232 (RS-232), or a plain old telephone service (POTS). The network may include at least one of telecommunications networks, for example, a computer network (e.g., LAN or a wide area network (WAN)), the Internet, or a telephone network.

Each of the external electronic devices 102 and 103 may be the same as or different from the electronic device 101. According to an embodiment of the present disclosure, all or a part of the operations that the electronic device 101 may perform may be executed by another or a plurality of electronic devices (e.g., the electronic devices 102 and 103). In the case where the electronic device 101 executes any function or service automatically or in response to a request, the electronic device 101 may not perform the function or the service internally, but, alternatively or additionally, it may request at least a portion of a function associated with the electronic device 101 at the electronic device 102 or 103. The other electronic device 102 or 103 may execute the requested function or an additional function and may transmit the execution result to the electronic device 101. The electronic device 101 may provide the requested function or service using the received result or may additionally process the received result to provide the requested function or service. In this case, for example, cloud computing, distributed computing, or client-server computing may be used.

Figure 4:
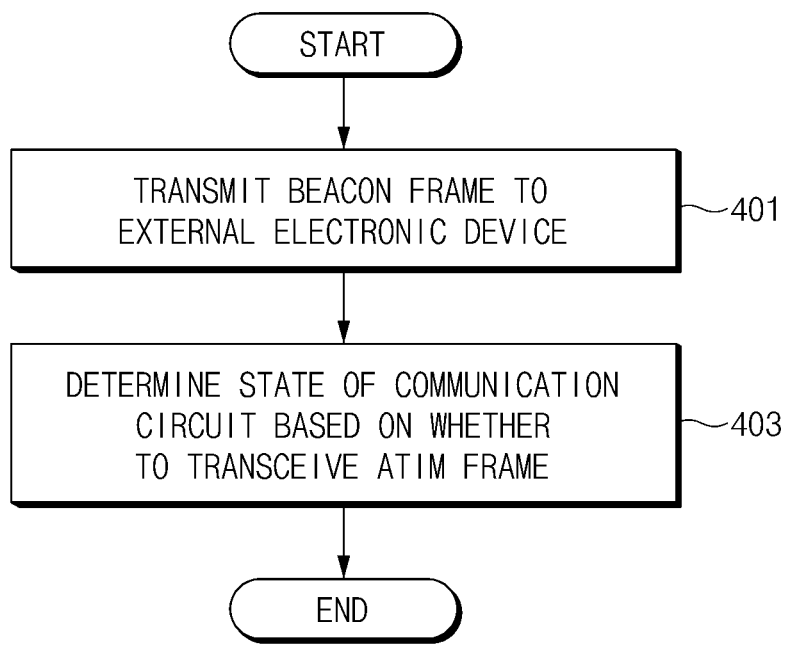
FIG. 4 is a flowchart of a power saving method of an electronic device operating in a power saving mode, according to an embodiment of the present disclosure.

FIG. 4 is a flowchart of a power saving method of an electronic device operating in a power saving mode, according to an embodiment of the present disclosure.

Referring to FIG. 4, a power saving method operating in a power saving mode may include operations 401 and 403. For example, the power saving method may be performed by the electronic device 100A or 100B illustrated in FIG. 2 which includes a configuration of the electronic device 101 illustrated in FIG. 3.

In operation 401, the communication circuit 170 of the electronic device 101 operating in the power saving mode may transmit a beacon frame defining a beacon interval to the external device 102. In operation 403, the processor 120 of the electronic device 101 may determine a state of the communication circuit 170 during the beacon interval based on whether to transceive an ATIM frame between the electronic device 101 and the external device 102.

Figure 5:
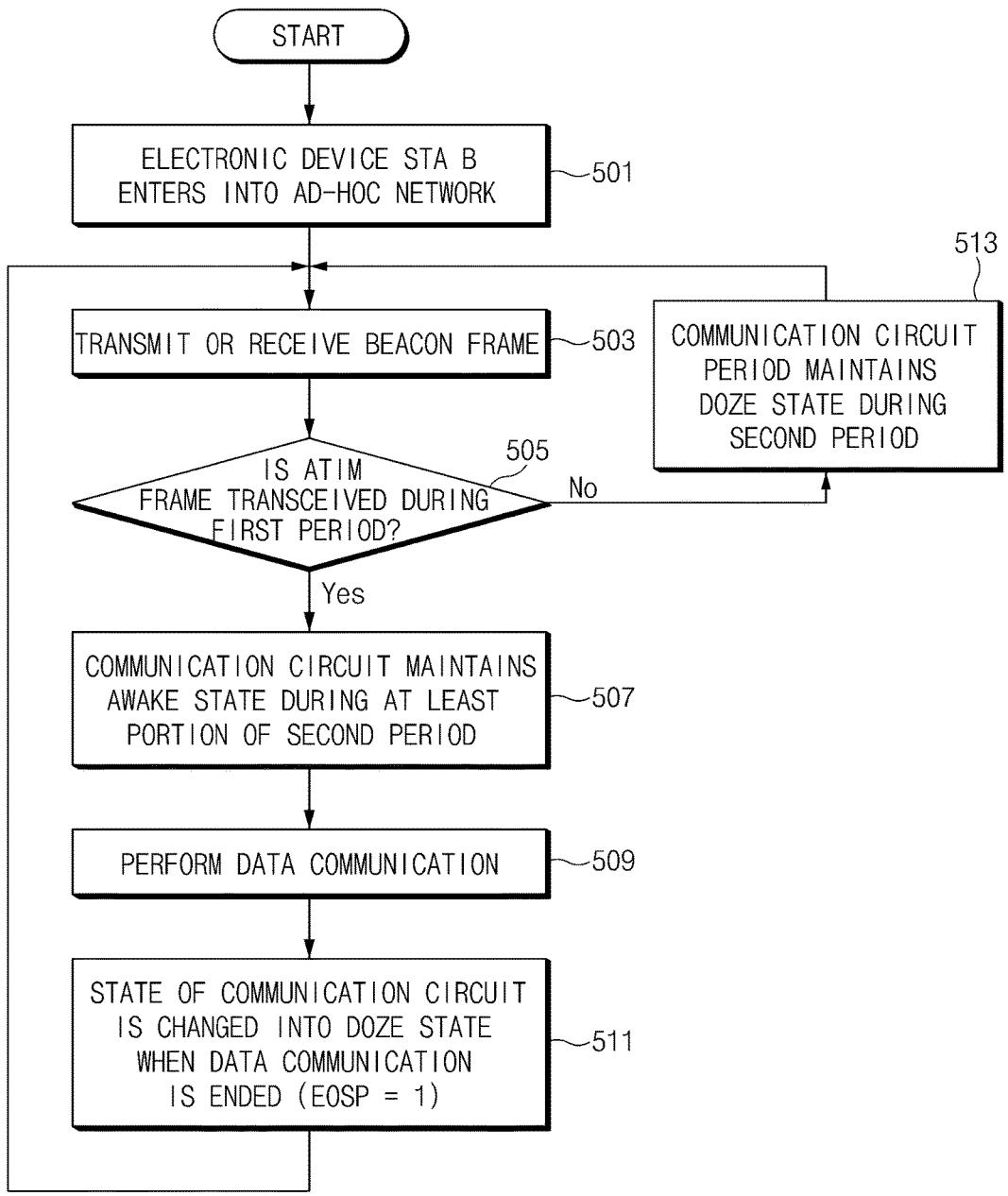
FIG. 5 is a flowchart of a power saving method of an electronic device operating in a power saving mode, according to an embodiment of the present disclosure.

FIG. 5 is a flowchart of a power saving method of an electronic device operating in a power saving mode, according to an embodiment of the present disclosure.

Referring to FIG. 5, a power saving method of an electronic device operating in a power saving mode may include operations 501 to 513. In FIG. 5, the power saving method may be performed by the electronic devices 100A and 100B illustrated in FIG. 2 which includes a configuration of the electronic device 101 illustrated in FIG. 3. With reference to FIG. 5, the power saving method is described below based on the electronic device 100A.

In operation 501, the electronic device 100B (e.g. STA B) may enter an ad-hoc network which includes the electronic device 100A. The electronic device 100B may enter the ad-hoc network as the electronic device 100B transmits a probe request frame to the electronic device 100A and the electronic device 100A transmits a probe response frame to the electronic device 100B in response to the probe request frame.

Moreover, in operation 501, each of the electronic devices 100A and 100B may perform beacon synchronization. Synchronization between a beacon interval and an ATIM window may be achieved through the beacon synchronization. When the beacon synchronization is performed, the communication circuit 170 of each of the electronic devices 100A and 100B may not enter a doze state during a constant time (e.g., a few seconds to tens of seconds).

In operation 503, the electronic device 100A may transmit or receive the beacon frame to/from the electronic device 100B. The beacon frame may include information defining the beacon interval and the ATIM frame.

In operation 505, the electronic device 100A may determine whether the ATIM frame is transmitted or received during a first period (e.g., an ATIM window period) of the beacon interval. In the case where the ATIM frame is transmitted or received during the first period, the method may proceed to operation 507. In the case where any ATIM frame is not transceived during the first period, the method may proceed to operation 513.

In operation 507, the electronic device 100A may determine the state of the embedded communication circuit 170 as an awake state during at least a portion of a second period of the beacon interval.

In operation 509, the electronic device 100A may perform a data communication through the communication circuit 170, which is in the awake state, during at least a portion of the second period.

In operation 511, if a data communication is ended in operation 509, the electronic device 100A may change the state of the communication circuit 170 into the doze state until a starting time of a next beacon interval. The start of a next beacon interval may be recognized by receiving a new beacon frame in operation 503. Moreover, an end time of the data communication may be a time when the EOSP message is 1.

In operation 513, because any ATIM frame is not transceived during the first period of the beacon interval, the electronic device 100A may determine the state of the embedded communication circuit 170 as the doze state during the second period of the beacon interval.

According to an embodiment of the present disclosure, if the ATIM frame is not transceived, any electronic device transmitting the beacon frame may change the state of a communication circuit of a corresponding electronic device into the doze state. Accordingly, even though a number of mobile terminals may be small, power consumption may be significantly reduced.

Figure 6:
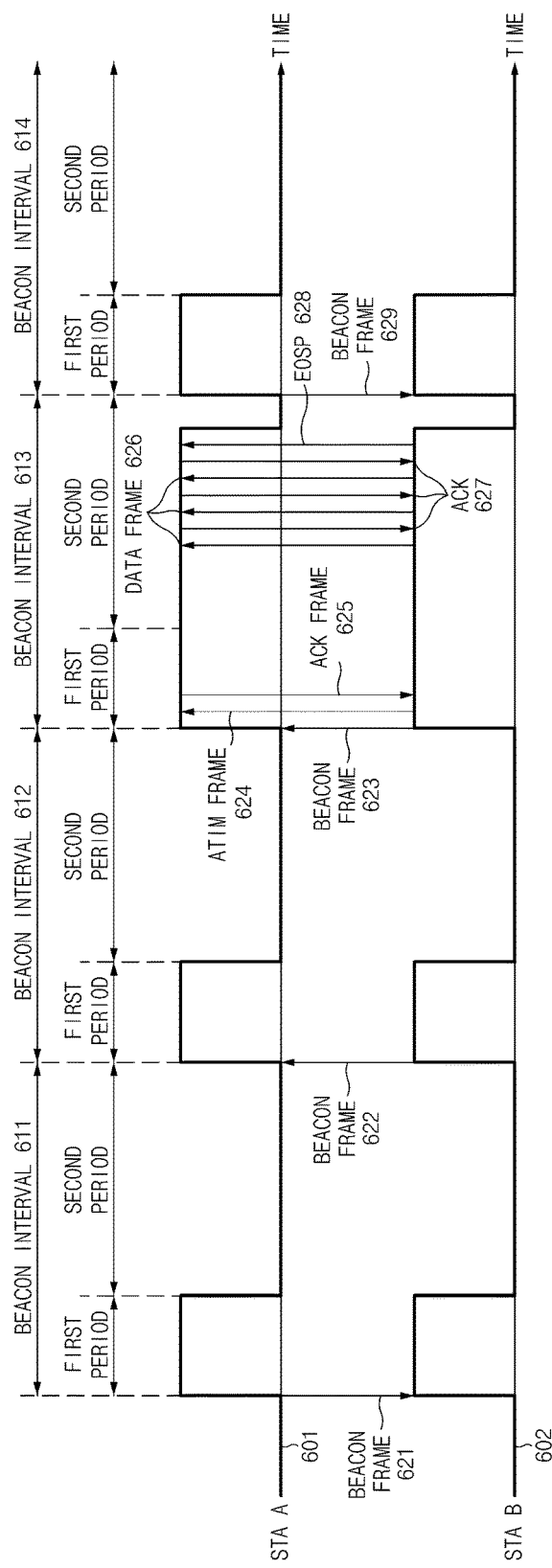
FIG. 6 is a timing diagram for describing a power saving mode of an electronic device, according to an embodiment of the present disclosure.

FIG. 6 is a timing diagram for describing a power saving mode of an electronic device according to an embodiment of the present disclosure.

Referring to FIG. 6, a timing signal 601 of the electronic device 100A and a timing signal 602 of the electronic device 100B may be illustrated. As described above, a logic high of each timing signal may indicate that a communication circuit included in an electronic device is in an awake state, and a logic low of each timing signal may indicate that the communication circuit is in a doze state.

A data frame may not be transmitted during beacon intervals 611, 612, and 614, and data frames 626 and ACK frames 627 may be transmitted during a beacon interval 613.

The electronic device 100A may transmit beacon frames 621 and 629 to the electronic device 100B during the beacon intervals 611 and 614, and the electronic device 100B may transmit a beacon frame 622 to the electronic device 100A during the beacon interval 612. Because the ATIM frame is not transceived between the electronic devices 100A and 100B, an electronic device transmitting a beacon frame may allow the communication circuit to enter the doze state during a second period after a first period (i.e., the ATIM window).

During the first period of the beacon interval 613, the electronic device 100B may transmit a beacon frame 623 and an ATIM frame 624 to the electronic device 100A. The electronic device 100A may transmit an ACK frame 625 as a response of the ATIM frame 624. Because the ATIM frame is transceived between the electronic devices 100A and 100B, the electronic devices 100A and 100B may maintain the awake state during the second period of the beacon interval 613. The data frames 626 and the ACK frames 627 corresponding to the data frames 626 may be transmitted during a portion of the second period while the awake state of the communication circuit is maintained. If the transmission of the data frames 626 and the ACK frames 627 is completed, an EOSP 628 message may be transmitted, and thus each of a state of the electronic devices 100A and 100B may be changed into the doze state before the starting time of the next beacon interval 614 in response to the EOSP message 628.

In the case where there is no data transmission, an electronic device according to an embodiment of the present disclosure may enter the doze state during the remaining beacon intervals except the ATIM window period. Accordingly, even though the number of electronic devices forming an ad-hoc network is small, power consumption may be significantly reduced.

Figure 7:
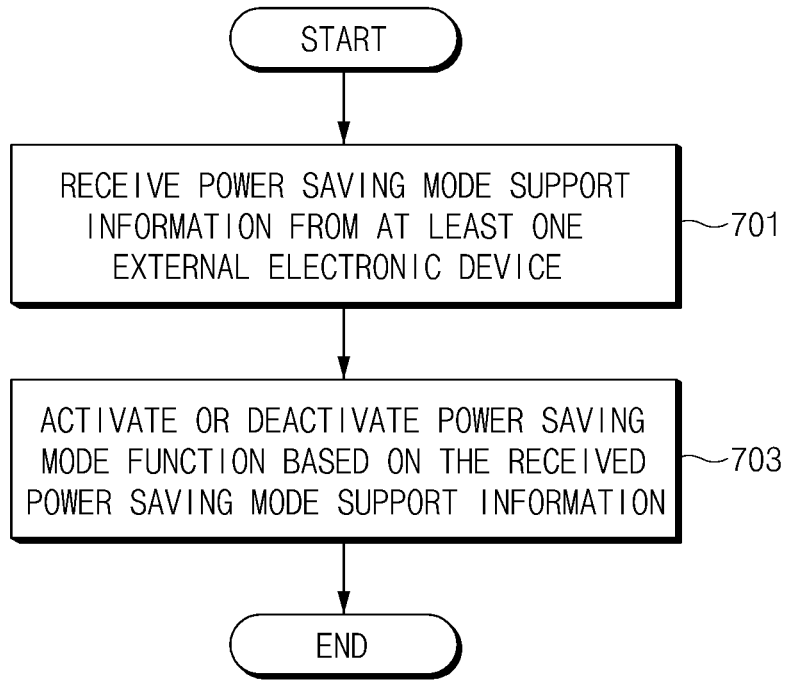
FIG. 7 is a flowchart of a power saving method of an electronic device, according to an embodiment of the present disclosure.

FIG. 7 is a flowchart of a power saving method of an electronic device according to an embodiment of the present disclosure.

Referring to FIG. 7, a power saving method of an electronic device may include operations 701 and 703. For example, the power saving method may be performed at the electronic devices 100A, 100B, and/or 100C illustrated in FIG. 2 which includes a configuration of the electronic device 101 illustrated in FIG. 3.

In operation 701, the electronic device 101 may receive power saving mode support information from at least one external electronic device 102 and 103. The power saving mode support information may be information indicating whether an electronic device transmitting the power saving mode support information supports a power saving mode function. The beacon frame may include an ATIM window period information (e.g. power saving mode support information)

In operation 703, the electronic device 101 may activate or deactivate the power saving mode function of the electronic device 101 based on the power saving mode support information received in operation 701. In other words, the electronic device 101 may set an operating mode of the electronic device 101 to a power saving mode or an active mode based on the power saving mode support information.

Figure 8:
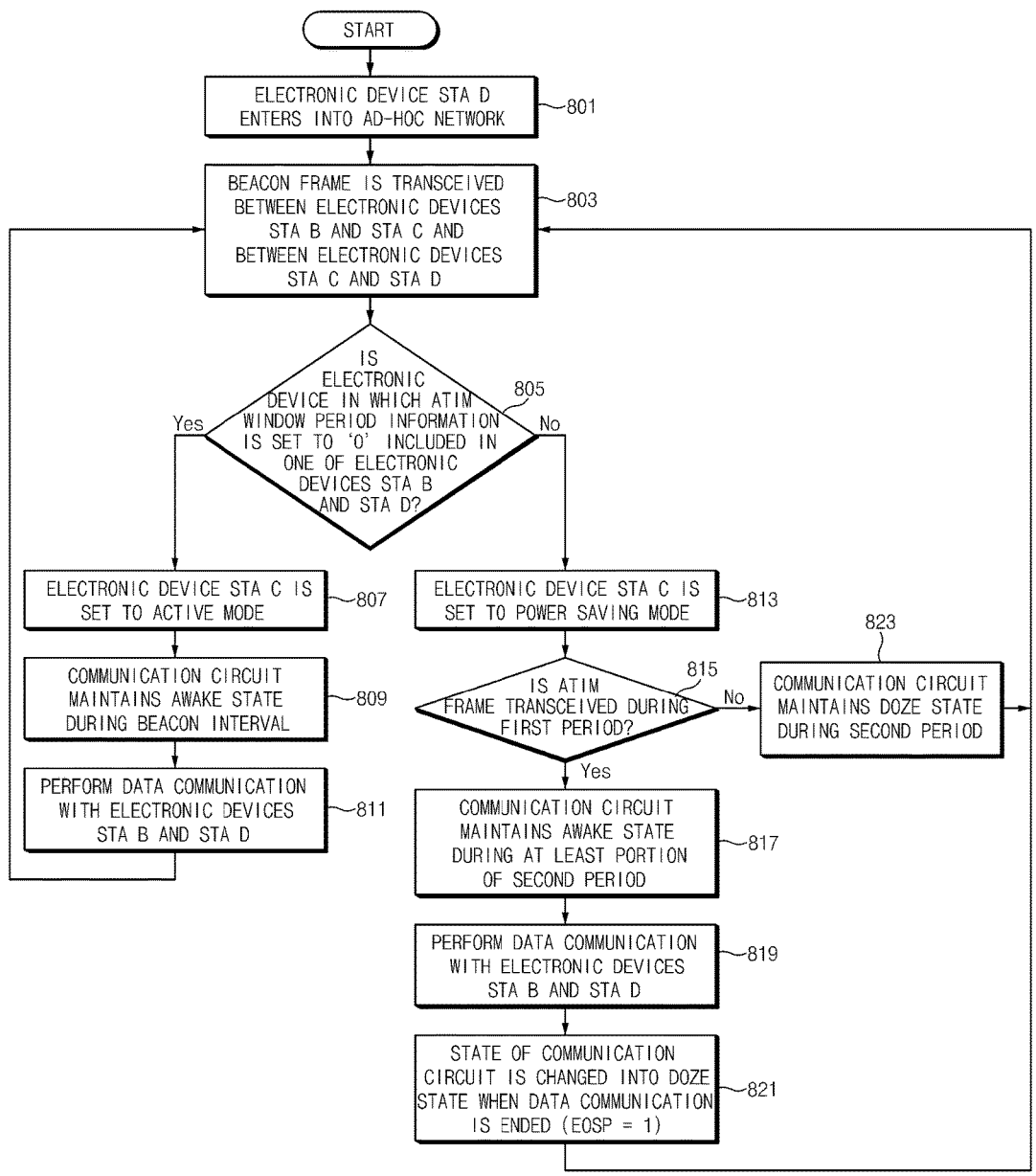
FIG. 8 is a flowchart of a power saving method of an electronic device, according to an embodiment of the present disclosure.

FIG. 8 is a flowchart of a power saving method of an electronic device according to another embodiment of the present disclosure.

Referring to FIG. 8, a power saving method of an electronic device may include operations 801 to 823. In FIG. 8, the power saving method may be performed at the electronic devices 100A, 100B, and/or 100C illustrated in FIG. 2 which includes a configuration of the electronic device 101 illustrated in FIG. 3. In FIG. 8, the power saving method is described below based on the electronic device 100C.

In operation 801, the electronic device 100D (e.g. STA D) may enter an ad-hoc network including at least the electronic devices 100B and 100C. The electronic device 100D may enter the ad-hoc network as the electronic device 100D transmits a probe request frame to the electronic device 100C and the electronic device 100C transmits a probe response frame to the electronic device 100D in response to the probe request frame. Each of the electronic devices 100C and 100D may perform beacon synchronization as well as may enter the network.

In operation 803, the electronic device 100C may transceive the beacon frame. The beacon interval may be defined by the beacon frame.

The beacon frame, the probe request frame, and/or the probe response frame may include an ATIM window period information (e.g. power saving mode support information). Accordingly, the electronic device 100C may obtain the ATIM window period information of each of the electronic devices 100B and 100D.

In operation 805, the electronic device 100C may determine whether the ATIM window period set to 0 is included in the ATIM window period information received from the electronic devices 100B and 100D. If the electronic device 100C receives the ATIM window period information of which the ATIM window period is set to 0, the electronic device 100C may determine a device transmitting the power saving mode support information as a device not supporting a power saving mode function. If the received ATIM window period information includes the ATIM window period set to 0, the method may proceed to operation 807. Otherwise, the method may proceed to operation 813.

For example, in operation 807, in the case where the ATIM window period transmitted from the electronic device 100B is not 0 but the ATIM window period transmitted from the electronic device 100D is 0, the electronic device 100C may deactivate the power saving mode function. That is, the electronic device 100C may be set to an active mode. Through the ATIM window period, the electronic device 100C may recognize that the electronic device 100B is a device supporting a power saving mode and the electronic device 100D is a device not supporting a power saving mode.

In operation 809, the electronic device 100C may allow the embedded communication circuit 170 to maintain an awake state during a beacon interval.

In operation 811, the electronic device 100C may perform a data communication with the electronic device 100D, which is a device not supporting a power saving mode, through the embedded communication circuit 170 during at least a portion of a beacon interval. Because the electronic device 100D is a device not supporting a power saving mode, the electronic device 100C may perform a data communication with the electronic device 100D, not transceiving the ATIM frame during at least a portion of the beacon interval.

Moreover, the electronic device 100C may perform a data communication with the electronic device 100B, which is a device supporting a power saving mode, based on whether to transceive the ATIM frame to/from the electronic device 100B. Because the electronic device 100B may be a device operating in the power saving mode, the electronic device 100C may perform a data communication with the electronic device 100B during a second period of a beacon interval with the assumption that the ATIM frame is transceived during the first period of the beacon interval. The data communication may be performed until a new beacon frame is received in operation 803 and the new interval period starts.

In contrast, in operation 813, if all the ATIM window periods received from the electronic device 100B and the electronic device 100D are not 0, the electronic device 100C may activate a power saving mode function. That is, the electronic device 100C may be set to a power saving mode. Through the ATIM window period, the electronic device 100C may recognize that each of the electronic devices 100B and 100D is a device supporting a power saving mode.

As a result, all the electronic devices 100B, 100C, and 100D may operate in a power saving mode due to activation of the power saving mode function in operation 813. Accordingly, operations 815 to 823 may correspond to operations 505 to 513 for describing a power saving method of a device supporting a power saving mode which are illustrated in FIG. 5.

In operation 815, the electronic device 100C may determine whether the ATIM frame is transmitted or received (e.g. transceived) during the first period of the beacon interval. In the case where the ATIM frame is transmitted or received during the first period, the method may proceed to operation 817. In the case where any ATIM frame is not transceived during the first period, the method may proceed to operation 823.

In operation 817, the electronic device 100C may determine the state of the embedded communication circuit 170 as the awake state during at least a portion of a second period of the beacon interval.

In operation 819, the electronic device 100C may perform a data communication with the electronic devices 100B and 100D through the communication circuit 170, which is in the awake state, during at least a portion of the second period.

In operation 821, if the data communication ends in operation 819, the electronic device 100A may change the state of the communication circuit 170 into a doze state before a starting time of a next beacon interval. The start of a next beacon interval may be recognized by receiving the new beacon frame in operation 803. Moreover, an end of the data communication may be a time when the EOSP message is 1.

In operation 823, because any ATIM frame is not transceived during the first period of the beacon interval, the electronic device 100C may determine the state of the embedded communication circuit 170 as the doze state during the second period of the beacon interval.

Figure 9:
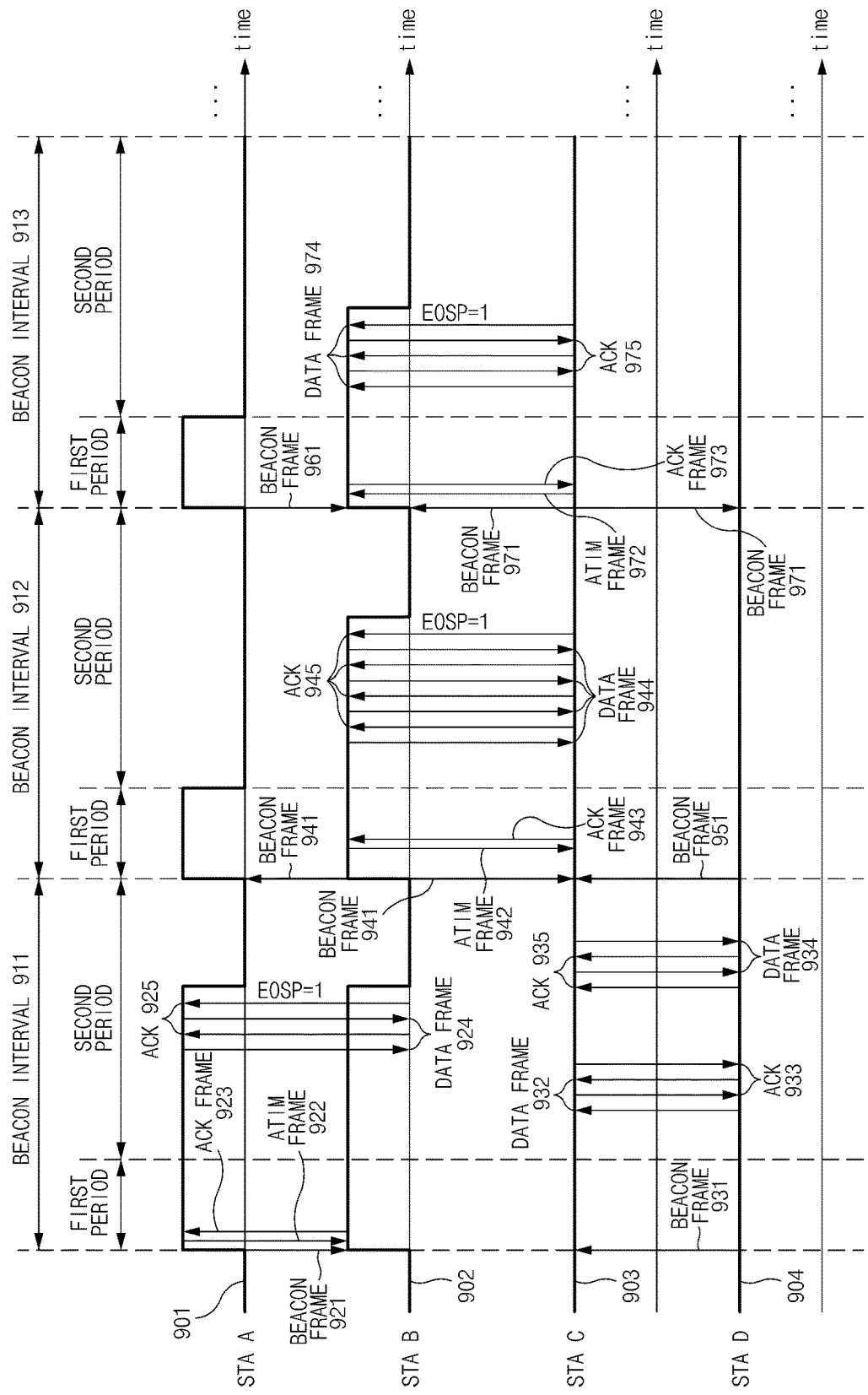
FIG. 9 is a timing diagram of an operation of an electronic device, according to an embodiment of the present disclosure.

FIG. 9 is a timing diagram of an operation of an electronic device, according to an embodiment of the present disclosure.

Referring to FIG. 9, timing signals 901, 902, 903, and 904 during beacon intervals 911, 912, and 913 are illustrated. For example, the timing signals 901 to 904 may be timing signals of the electronic devices 100A, 100B, 100C, and 100D. Each of the electronic devices 100A, 100B, and 100C, each of which supports a power saving mode, may operate in a power saving mode. The electronic device 100D not supporting a power saving mode may operate in an active mode.

During the beacon interval 911, the electronic device 100A may transmit a beacon frame 921 to the electronic device 100B. The electronic device 100A may transmit an ATIM frame 922 to the electronic device 100B during a first period and may receive an ACK frame 923 as a response of the transmission. Because the ATIM frame 922 is transceived between the electronic devices 100A and 100B, states of the electronic devices 100A and 100B may be set to an awake state during a portion of a second period. Data frames 924 and ACK frames 925 corresponding to the data frames 924 may be transmitted during a portion of the second period.

Moreover, the electronic device 100D may transmit a beacon frame 931 to the electronic device 100C during the beacon interval 911. Because the electronic device 100D is a device not supporting a power saving mode, a state of the electronic device 100D may be set to the awake state throughout the beacon intervals 911 to 913. Because the electronic device 100C is a device supporting a power saving mode but the electronic device 100D not supporting a power saving mode which is spaced apart from the electronic device 100C by one hop is included in an ad-hoc network, the state of the electronic device 100C may be set to the awake state throughout the beacon intervals 911 to 913. Accordingly, the electronic device 100D may transceive data frames 932 and data frames 934 and ACK frames 933 and ACK frames 935 corresponding to the data frames 932 and the data frames 934 to/from the electronic device 100C, without transmitting the ATIM frame.

During the beacon interval 912, the electronic device 100B may transmit a beacon frame 941 to the electronic devices 100A and 100C, and the electronic device 100D may transmit a beacon frame 951 to the electronic device 100C. During a first period, the electronic device 100B may transmit an ATIM frame 942 to the electronic device 100C and may receive an ACK frame 943 as a response of the transmission. Because the ATIM frame 942 is transceived between the electronic devices 100B and 100C, the state of the electronic device 100B may be set to the awake state during a portion of a second period. The electronic device 100C may be in the awake state during the beacon interval 912 due to the presence of the electronic device 100D. Data frames 944 and ACK frames 945 corresponding to the data frames 944 may be transmitted during a portion of the second period.

During the beacon interval 913, the electronic device 100A may transmit a beacon frame 961 to the electronic device 100B, and the electronic device 100C may transmit a beacon frame 971 to the electronic devices 100B and 100D. During a first period, the electronic device 100C may transmit an ATIM frame 972 to the electronic device 100B and may receive an ACK frame 973 as a response of the transmission. Because the ATIM frame 972 is transceived between the electronic devices 100B and 100C, the state of the electronic device 100B may be set to the awake state during a portion of a second period. The electronic device 100C may be in the awake state during the beacon interval 913 due to the presence of the electronic device 100D. Data frames 974 and ACK frames 975 corresponding to the data frames 974 may be transmitted during a portion of the second period.

As a result, even though the electronic device 100C is a device supporting a power saving mode, the electronic device 100C may maintain the awake state throughout the beacon intervals 911 to 913 due to the presence of the electronic device 100D. Because the electronic device 100C maintains the awake state throughout the beacon intervals 911 to 913, the electronic device 100C may perform a data communication with an electronic device using a proper method based on whether the electronic device supports a power saving mode.

According to an embodiment of the present disclosure, compatibility between a device supporting a power saving mode and a device not supporting a power saving mode may be assured. That is, in a heterogeneous terminal environment in which there are a device supporting a power saving mode and a device not supporting a power saving mode, power consumption may be significantly reduced.

If a device not supporting a power saving mode enters into an ad-hoc network that includes only a device supporting a power saving mode, a state of the device supporting a power saving mode which is spaced apart from the device not supporting a power saving mode by one hop may be the only device changed into an active mode. Accordingly, states of all electronic devices forming the ad-hoc network may not always be changed into an active mode.

Based on experimentation, if an electronic device according to an embodiment of the present disclosure communicates using a Wi-Fi channel of 5 GHz, an idle current in a power saving mode may be about 30 mA, and an idle current in an active mode may be about 140 mA. Accordingly, for example, if three devices each of which supports a power saving mode and a device not supporting a power saving mode are included in a network topology illustrated in FIG. 2, total consumption current in the network may be 340 mA (i.e., 30×2+140×2) (e.g., STA A and STA B are in power saving mode, STA C and STA D are in active mode in FIG. 9). However, if states of all electronic devices are changed into an active state due to the only one device that does not support a power saving mode, the total current consumption may be 560 mA (i.e., 140×4). Accordingly, a power saving may be about 40%.

Figure 10:
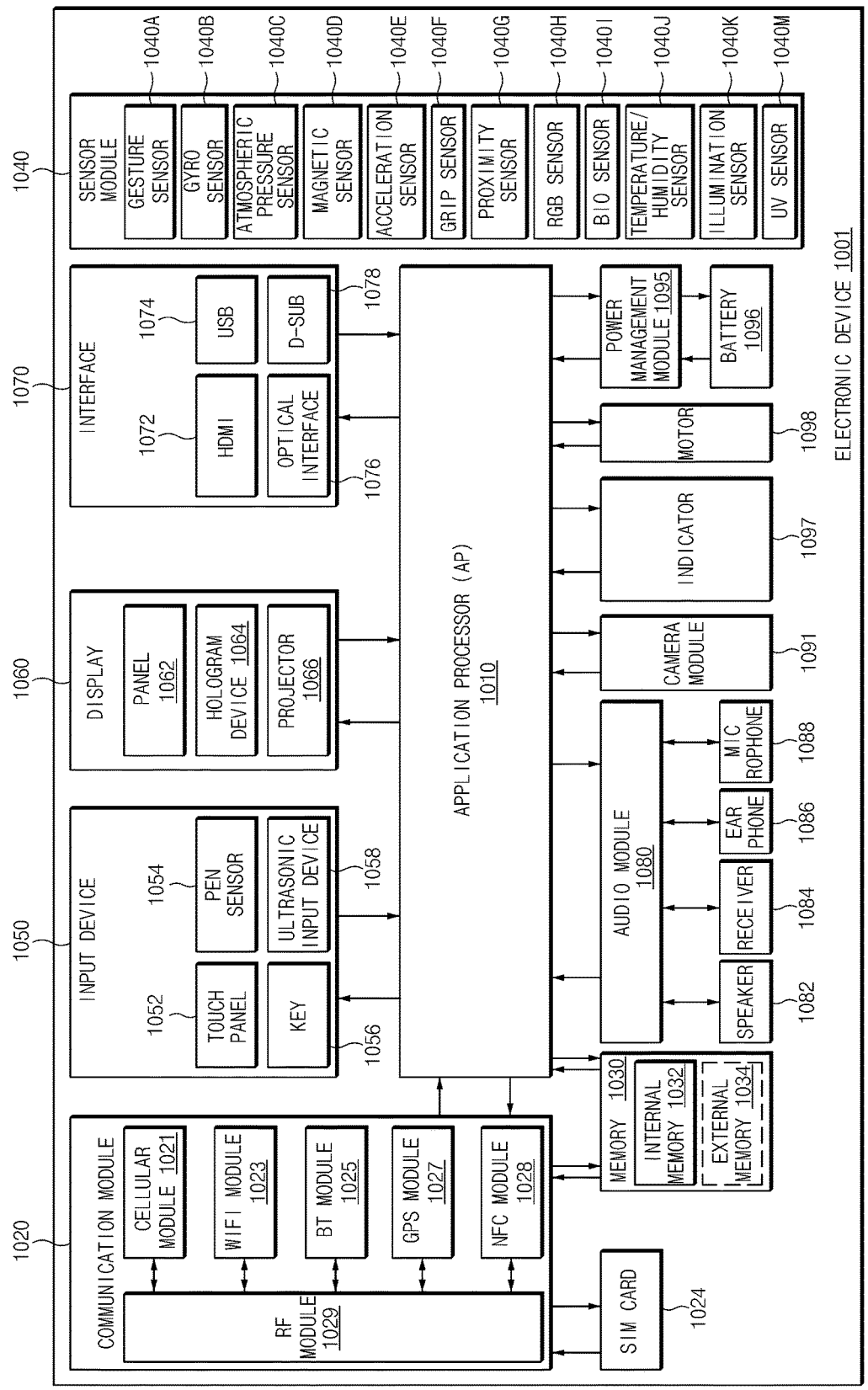
FIG. 10 is a block diagram of an electronic device, according to an embodiment of the present disclosure.

FIG. 10 is a block diagram of an electronic device 1001 according to an embodiment of the present disclosure.

Referring to FIG. 10, the electronic device 1001 may include, for example, all or a part of an electronic device 101 illustrated in FIG. 3. The electronic device 1001 may include one or more processors (e.g., an AP) 1010, a communication module (or communication circuit) 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may drive an OS or an application to control a plurality of hardware or software components connected to the AP 1010 and may process and compute a variety of data. The AP 1010 may be implemented with a system on chip (SoC), for example. The AP 1010 may further include a graphics processing unit (GPU) and/or an image signal processor. The AP 1010 may include at least a part (e.g., a cellular module 1021) of components illustrated in FIG. 3. The AP 1010 may load and process an instruction or data, which is received from at least one other component (e.g., a nonvolatile memory), and may store a variety of data in a nonvolatile memory.

The communication module 1020 may be configured the same as or similar to the communication circuit 170 of FIG. 3. The communication module 1020 may include the cellular module 1021, a Wi-Fi module 1023, a Bluetooth (BT) module 1025, a GPS module 1027 (e.g., a GNSS module, a Glonass module, a BeiDou module, or a Galileo module), an NFC module 1028, and a radio frequency (RF) module 1029.

The cellular module 1021 may provide voice communication, video communication, a character service, an Internet service or the like through a communication network. The cellular module 1021 may perform discrimination and authentication of the electronic device 1001 within a communication network using the SIM card 1024, for example. The cellular module 1021 may perform at least a portion of the functions that the AP 1010 provides. The cellular module 1021 may include a CP.

Each of the Wi-Fi module 1023, the BT module 1025, the GPS module 1027, and the NFC module 1028 may include a processor for processing data exchanged through a corresponding module, for example. At least a portion (e.g., two or more components) of the cellular module 1021, the Wi-Fi module 1023, the BT module 1025, the GPS module 1027, and the NFC module 1028 may be included within one integrated circuit (IC) or an IC package.

The RF module 1029 may transmit and receive a communication signal (e.g., an RF signal). The RF module 1029 may include a transceiver, a power amplifier module (PAM), a frequency filter, a low noise amplifier (LNA), an antenna, or the like. At least one of the cellular module 1021, the Wi-Fi module 1023, the BT module 1025, the GPS module 1027, or the NFC module 1028 may transmit and receive an RF signal through a separate RF module.

The SIM card 1024 may include, for example, unique identification information (e.g., integrated circuit card identifier (ICCID)) or subscriber information (e.g., integrated mobile subscriber identity (IMSI)).

The memory 1030 may include an internal memory 1032 or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1034 may include a flash drive, for example, compact flash (CF) drive, a secure digital (SD) memory card, a micro secure digital (Micro-SD) memory card, a mini secure digital (Mini-SD) memory card, an extreme digital (xD) memory card, a multimedia card (MMC), a memory stick, or the like. The external memory 1034 may be functionally and/or physically connected to the electronic device 1001 through various interfaces.

The sensor module 1040 may measure, for example, a physical quantity or may detect an operation state of the electronic device 1001. The sensor module 840 may convert the measured or detected information to an electrical signal. The sensor module 1040 may include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric (e.g. bio) sensor 1040I, a temperature/humidity sensor 1040J, an illumination sensor 1040K, or an ultra violet (UV) light sensor 1040M. Additionally or alternatively, the sensor module 1040 may further include, for example, an electronic nose (E-nose) sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1040 may further include a control circuit for controlling at least one or more sensors included therein. The electronic device 1001 may further include a processor which is a part of, or independent of, the AP 1010 and is configured to control the sensor module 1040. The processor may control the sensor module 1040 while the processor 810 remains in a doze state.

The input device 1050 may include, for example, a touch panel 1052, a (digital) pen sensor 1054, a key 1056, or an ultrasonic input unit 1058. The touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, and the like. The ultrasonic input device 1058 may detect (or sense) an ultrasonic signal, which is generated from an input device, through a microphone 1088 and may check data corresponding to the detected ultrasonic signal.

The display 1060 (e.g., the display 160 illustrated in FIG. 3) may include a panel 1062, a hologram device 1064, or a projector 1066. The panel 1062 may be configured the same as or similar to a display 160 of FIG. 3. The panel 1062 may be implemented to be flexible, transparent or wearable, for example. The panel 1062 and the touch panel 1052 may be integrated into a single module. The hologram device 1064 may display a stereoscopic image in a space using the interference of light. The projector 1066 may project light onto a screen so as to display an image. The screen may be arranged internal to or external of the electronic device 1001. The display 1060 may further include a control circuit for controlling the panel 1062, the hologram device 1064, or the projector 1066.

The interface 1070 may include, for example, an HDMI 1072, a USB 1074, an optical interface 1076, or a D-subminiature (D-sub) connector 1078. The interface 1070 may be included, for example, in a communication circuit 170 illustrated in FIG. 3. Additionally or alternatively, the interface 1070 may include, for example, a mobile high definition link (MHL) interface, an SD card/multi-media card (MMC) interface, or an infrared data association (IrDA) standard interface.

The audio module 1080 may convert a sound to an electrical signal and vice versa. At least a portion of the audio module 1080 may be included, for example, in an input/output interface 150 illustrated in FIG. 3. The audio module 1080 may process, for example, sound information that is input or output through a speaker 1082, a receiver 1084, an earphone 1086, or the microphone 1088.

The camera module 1091 for shooting a still image or a video may include, for example, at least one image sensor (e.g., a front sensor or a rear sensor), a lens, an image signal processor (ISP), or a flash (e.g., an LED or a xenon lamp).

The power management module 1095 may manage, for example, power of the electronic device 1001. The power management module 1095 may include a power management integrated circuit (PMIC), a charger IC, or a battery gauge. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery or a solar battery.

The indicator 1097 may display a certain state of the electronic device 1001 or a portion thereof (e.g., an AP 1010), such as a booting state, a message state, a charging state, and the like. The motor 1098 may convert an electrical signal into a mechanical vibration and may generate a vibration, a haptic event, and the like. A processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFlo™, or the like.

Each of the above-mentioned elements of the electronic device of the present disclosure may be configured with one or more components, and the names of the elements may be changed according to the type of the electronic device. The electronic device of the present disclosure may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

Figure 11:
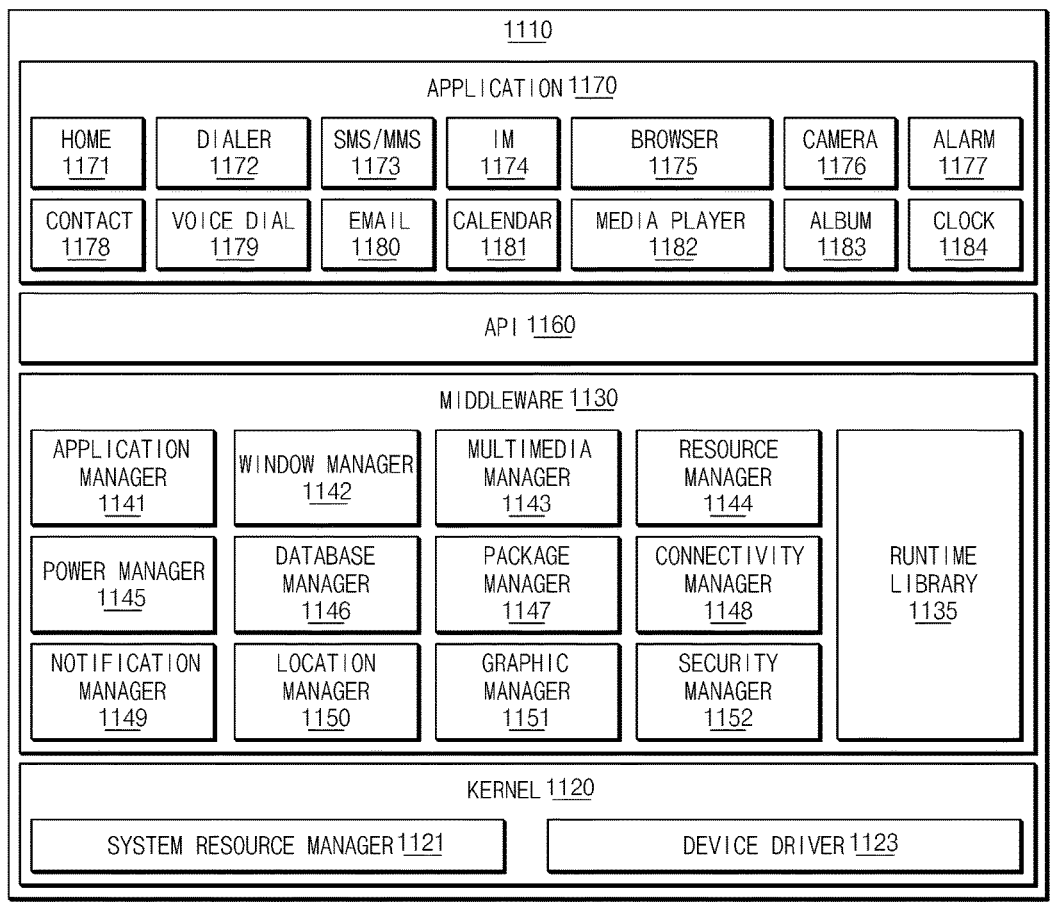
FIG. 11 is a block diagram of a program module, according to an embodiment of the present disclosure.

FIG. 11 is a block of a program module 1110 according to an embodiment of the present disclosure.

Referring to FIG. 11, the program module 1110 (e.g., the program 140 of FIG. 3) may include an OS to control resources associated with an electronic device (e.g., the electronic device 101 of FIG. 3), and/or diverse applications (e.g., the application program 147 of FIG. 3) driven on the OS. The OS may be, for example, Android®, iOS®, Windows®, Symbian™, Tizen®, or Bada™.

The program module 1110 may include, for example, a kernel 1120, a middleware 1130, an application programming interface (API) 1160, and/or an application 1170. At least a part of the program module 1110 may be preloaded on an electronic device or may be downloadable from an external electronic device 102 or 103, and the like.

The kernel 1120 (e.g., the kernel 141 of FIG. 3) may include, for example, a system resource manager 1121 or a device driver 1123. The system resource manager 1121 may perform control, allocation, or retrieval of system resources. The system resource manager 1121 may include a process managing part, a memory managing part, or a file system managing part. The device driver 1123 may include, for example, a display driver, a camera driver, a Bluetooth driver, a common memory driver, a USB driver, a keypad driver, a Wi-Fi driver, an audio driver, or an inter-process communication (IPC) driver.

The middleware 1130 may provide, for example, a function which the application 1170 needs in common, or may provide diverse functions to the application 1170 through the API 1160 to allow the application 1170 to efficiently use limited system resources of the electronic device. The middleware 1130 (e.g., the middleware 143 of FIG. 3) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, or a security manager 1152.

The runtime library 1135 may include, for example, a library module which is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a graphical user interface (GUI) resource which is used in a screen. The multimedia manager 1143 may identify a format necessary for playing diverse media files, and may perform encoding or decoding of media files by using a codec suitable for the format. The resource manager 1144 may manage resources such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify a database which is to be used in at least one application of the application 1170. The package manager 1147 may install or update an application which is distributed in the form of a package file.

The connectivity manager 1148 may manage, for example, a wireless connection such as Wi-Fi or Bluetooth. The notification manager 1149 may display or notify an event such as arrival message, or proximity notification in a mode that does not disturb a user. The location manager 1150 may manage location information of an electronic device. The graphic manager 1151 may manage a graphic effect that is provided to a user, or manage a user interface relevant thereto. The security manager 1152 may provide a general security function necessary for system security or user authentication. In the case where an electronic device (e.g., the electronic device 101 of FIG. 3) includes a telephony function, the middleware 1130 may further include a telephony manager for managing a voice or video call function of the electronic device.

The middleware 1130 may include a middleware module that combines diverse functions of the above-described components. The middleware 1130 may provide a module specialized to each kind of OS to provide differentiated functions. Additionally, the middleware 1130 may remove a part of the preexisting components, dynamically, or may add a new component thereto.

The API 1160 (e.g., the API 145 of FIG. 3) may be, for example, a set of programming functions and may be provided with a configuration which is variable, depending on an OS. For example, in the case where an OS is Android® or iOS®, it may be permissible to provide one API set per platform. In the case where an OS is Tizen®, it may be permissible to provide two or more API sets per platform.

The application 1170 (e.g., the application program 147 of FIG. 3) may include, for example, one or more applications capable of providing functions for a home application 1171, a dialer application 1172, an short message service/multimedia messaging service (SMS/MMS) application 1173, an instant messaging application (IM) 1174, a browser application 1175, a camera application 1176, an alarm application 1177, a contact application 1178, a voice dial application 1179, an e-mail application 1180, a calendar application 1181, a media player application 1182, an album application 1183, a clock application 1184, a health care application for offering health care (e.g., measuring an amount of exercise or a blood sugar level), or an environmental information application (e.g., atmospheric pressure, humidity, or temperature).

The application 1170 may include an application (an information exchanging application) to support information exchange between the electronic device (e.g., the electronic device 101 of FIG. 3) and an external electronic device (e.g., the electronic device 102 or 103 of FIG. 3). The information exchanging application may include, for example, a notification relay application for transmitting certain information to an external electronic device, or a device management application for managing an external electronic device.

For example, the notification relay application may include a function of transmitting notification information, which arises from other applications (e.g., applications for SMS/MMS 1173, e-mail 1180, health care, or environmental information), to an external electronic device (e.g., an electronic device 102 or 103 of FIG. 3). Additionally, the notification relay application may receive, for example, notification information from an external electronic device and provide the notification information to a user.

The device management application may manage (e.g., install, delete, or update), for example, at least one function (e.g., turn-on/turn-off an external electronic device (or a part of components) or adjustment of brightness (or resolution) of a display) of the external electronic device 102 or 103 in FIG. 3 which communicates with the electronic device, an application running in an external electronic device, or a service (e.g., a call service, a message service, or the like) provided from an external electronic device.

The application 1170 may include an application (e.g., a health care application of a mobile medical device, and the like) which is assigned in accordance with an attribute of an external electronic device 102 or 103 of FIG. 3. The application 1170 may include an application which is received from an external electronic device. The application 1170 may include a preloaded application or a third party application which is downloadable from a server. The component titles of the program module 1110 may be modifiable depending on the kind of OS.

According to an embodiment of the present disclosure, at least a portion of the program module 1110 may be implemented by software, firmware, hardware, or a combination of two or more thereof. At least a portion of the program module 1110 may be implemented (e.g., executed), for example, by a processor (e.g., the AP 1010 of FIG. 10). At least a portion of the program module 1110 may include, for example, modules, programs, routines, sets of instructions, or processes, or the like for performing one or more functions.

The term "module" used herein may indicate, for example, a unit including one or more combinations of hardware, software and firmware. The term "module" may be interchangeably used with the terms "unit," "logic," "logical block," "component," and "circuit." The term "module" may refer to a minimum unit of an integrated component or a part thereof. The term "module" may refer to a minimum unit for performing one or more functions or a part thereof. The term "module" may refer to a unit that may be implemented mechanically or electronically. For example, the term "module" may refer to at least one of an application-specific IC (ASIC), a field-programmable gate array (FPGA), and a programmable-logic device for performing operations which are known or will be developed.

At least a portion of an apparatus (e.g., modules or functions thereof) or a method (e.g., each of the method in FIGS. 4, 5, 7, and 8) according to various embodiments of the present disclosure may be, for example, implemented by instructions stored in a non-transitory computer-readable storage medium in the form of a program module. The instruction, when executed by one or more processors (e.g., a processor 120 of FIG. 3), may cause the one or more processors to perform a function corresponding to the instruction. The non-transitory computer-readable storage medium, for example, may be the memory 130.

A non-transitory computer-readable storage medium may include a hard disk, a magnetic media, a floppy disk, a magnetic media (e.g., a magnetic tape), an optical media (e.g., a compact disc read only memory (CD-ROM) and DVD, a magneto-optical media (e.g., a floptical disk), and hardware devices (e.g., a ROM, a random access memory (RAM), or a flash memory). Also, a program instruction may include not only object code such as code generated by a compiler but also high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to various embodiments of the present disclosure, power consumption may be efficiently reduced, compared with the power saving method according to a wireless communication standard. Moreover, compatibility of the power saving mode may be provided in an ad-hoc network While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. An electronic device supporting a power saving mode function, the electronic device comprising:
   a communication circuit configured to receive information about an announcement traffic indication message (ATIM) window period, from at least one external device forming an ad-hoc network; and
   a processor configured to activate or deactivate the power saving mode function based on the received information about the ATIM window period,
   wherein the processor is further configured to deactivate the power saving mode function, if at least one ATIM window period is set to 0,
   wherein the processor is further configured to activate the power saving mode function, if every ATIM window period from the at least one external device is set to non-'0', and
   wherein the processor is further configured to identify a device that transmits information about the ATIM window period being set to 0 as a device not supporting the power saving mode function.

2. The electronic device of claim 1, wherein the communication circuit is further configured to transceive a beacon frame defining a beacon interval to and from the at least one external device, and
   wherein if the power saving mode function of the electronic device is deactivated, the processor is further configured to maintain a state of the communication circuit in an awake state during the beacon interval.

3. The electronic device of claim 1, wherein the processor is further configured to perform a data communication with a device not supporting the power saving mode function among the at least one external device through the communication circuit during at least a portion of a beacon interval.

4. The electronic device of claim 1, wherein the at least one external device forming the ad-hoc network comprises a device supporting the power saving mode function and the device not supporting the power saving mode function, and
   wherein the processor is further configured to perform a data communication with the device not supporting the power saving mode function based on whether to transceive an ATIM frame.

5. The electronic device of claim 1, wherein the communication circuit is further configured to transceive a beacon frame defining a beacon interval to and from the at least one external device, and
   wherein if the power saving mode function of the electronic device is activated, the processor is further configured to determine a state of the communication circuit during the beacon interval based on whether to transceive an ATIM frame between the electronic device and the at least one external device.

6. The electronic device of claim 1, wherein the communication circuit is further configured to receive a probe request frame comprising the information about the ATIM window period from the at least one external device.

7. The electronic device of claim 1, wherein the communication circuit is further configured to receive a beacon frame comprising the information about the ATIM window period from the at least one external device.

8. A power saving method of an electronic device forming an ad-hoc network, the method comprising:
   receiving, from at least one external device forming the ad-hoc network, information about an announcement traffic indication message (ATIM) window period; and
   activating or deactivating a power saving mode function of the electronic device based on the received information about the ATIM window period,
   wherein the power saving mode function is deactivated, if at least one ATIM window period is set to 0,
   wherein the power saving mode function is activated, if every ATIM window period from the at least one external device is set to non-'0', and
   wherein the electronic device identifies a device that transmits information about the ATIM window period being set to 0 as a device not supporting the power saving mode function.

9. The method of claim 8, wherein the electronic device and the at least one external device neighbor with each other by 1 hop.

10. The electronic device of claim 1, wherein the electronic device and the at least one external device neighbor with each other by 1 hop.

* * * * *